United States Patent
Nicol et al.

(10) Patent No.: US 9,040,600 B2
(45) Date of Patent: May 26, 2015

(54) PROCESS FOR THE PREPARATION OF EXPANDABLE POLYSTYRENE BY CONTINUOUS INJECTION OF A LIQUID ORGANIC PEROXIDE

(75) Inventors: Pascal Nicol, Saint Genis Laval (FR); Jacques Cochet, Chanas (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 13/386,958

(22) PCT Filed: Jul. 22, 2010

(86) PCT No.: PCT/FR2010/051548
§ 371 (c)(1),
(2), (4) Date: Feb. 17, 2012

(87) PCT Pub. No.: WO2011/012798
PCT Pub. Date: Feb. 3, 2011

(65) Prior Publication Data
US 2012/0142797 A1 Jun. 7, 2012

Related U.S. Application Data

(60) Provisional application No. 61/228,740, filed on Jul. 27, 2009.

(30) Foreign Application Priority Data

Jul. 27, 2009 (FR) ..................................... 09 55241

(51) Int. Cl.
| | |
|---|---|
| *C08L 25/06* | (2006.01) |
| *C08F 4/38* | (2006.01) |
| *C08F 2/18* | (2006.01) |
| *C08F 4/34* | (2006.01) |
| *C08J 9/14* | (2006.01) |
| *C08J 9/20* | (2006.01) |

(52) U.S. Cl.
CPC ... *C08F 4/38* (2013.01); *C08F 2/18* (2013.01); *C08F 4/34* (2013.01); *C08J 9/141* (2013.01); *C08J 9/20* (2013.01); *C08J 2325/04* (2013.01)

(58) Field of Classification Search
CPC ....................................................... C08L 25/06
USPC ........................................................ 521/147
See application file for complete search history.

(56) References Cited

U.S. PATENT DOCUMENTS

| | | | | |
|---|---|---|---|---|
| 6,608,150 | B1 * | 8/2003 | Wicher | ........................... 526/73 |
| 7,132,485 | B2 * | 11/2006 | Boevenbrink et al. | .......... 526/86 |
| 2004/0249003 | A1 | 12/2004 | Datko et al. | |
| 2005/0256216 | A1 | 11/2005 | Berti et al. | |
| 2011/0015286 | A1 | 1/2011 | Nicol et al. | |

FOREIGN PATENT DOCUMENTS

EP 2105457 A1 9/2009

OTHER PUBLICATIONS

Klodt, R.D.; Gougeon, B. "Particle Foam Based on Expandable Polystyrene" in "Modern Styrenic Polymers: Polystyrenes and Styrenic Copolymers" ed. by J. Scheirs and D.B. Priddy, 2003. John Wiley & Sons. ISBN 0-471-49752-5.*

Allcock, H.R.; Lampe, F.W.; Mark, J.E. "Thermal Decomposition of Initiators" in Contemporary Polymer Chemistry. 3rd edition pp. 62-64.*

International Search Report (PCT/ISA/210) issued on Oct. 6, 2010, by European Patent Office as the International Searching Authority for International Application No. PCT/FR2010/051548.

Junpo He et al., Rate enhancement of nitroxide-mediated living free-radical polymerization by continuous additions of initiator, Polymer 41, 2000, pp. 4573-4577.

* cited by examiner

*Primary Examiner* — Randy Gulakowski
*Assistant Examiner* — Christina Wales
(74) *Attorney, Agent, or Firm* — Buchanan Ingersoll & Rooney

(57) ABSTRACT

A process for the preparation of expandable polystyrene including the following steps: i°) heating an aqueous suspension including styrene monomer and at least one organic peroxide initiator of formula (I) 1-alkoxy-1-t-alkylperoxycyclohexane in which the alkoxy group contains 1 to 4 carbon atoms, the t-alkyl group contains 4 to 12 carbon atoms, and the cyclohexane ring may optionally be substituted with 1 to 3 alkyl groups each, independently having 1 to 3 carbon atoms, at a temperature ranging from 100° C. to 120° C., ii°) adding a blowing agent selected from the group of alkanes having from 4 to 6 carbon atoms and mixtures thereof. Also, an expandable polystyrene obtainable according to such a process and to insulation parts and packaging including such an expandable polystyrene.

17 Claims, No Drawings

PROCESS FOR THE PREPARATION OF EXPANDABLE POLYSTYRENE BY CONTINUOUS INJECTION OF A LIQUID ORGANIC PEROXIDE

CROSS-REFERENCE TO RELATED APPLICATIONS

The present application is a national stage application of international application no. PCT/FR2010/051548, filed on Jul. 22, 2010, which claims priority of French application no. 0955241, filed on Jul. 27, 2009, and U.S. provisional application No. 61/228,740, filed on Jul. 27, 2009. Each of international application no. PCT/FR2010/051548, French application no. 0955241, and U.S. provisional application No. 61/228,740 are hereby incorporated by reference in entirety.

TECHNICAL FIELD

The present invention relates to a process for the preparation of expandable polystyrene and to an expandable polystyrene obtainable by such a process.

BACKGROUND

A known method for producing expandable polystyrene polymers, hereinafter referred to as EPS, is by aqueous suspension polymerization. It is typically a batch process where two or more monomer-soluble polymerization initiators are used with a rising stepwise, continuous, or combination temperature profile. Initiators for the process are selected on the basis of their half life temperatures to provide a measured supply of radicals at selected points along the temperature profile such that effective conversion occurs within an acceptable period of time. For styrene polymerization, it is convenient to describe initiator decomposition performance in terms of one hour half life temperature, defined as that temperature sufficient to cause decomposition of one half of the starting concentration of initiator over a one hour time period.

Traditionally, suspension polymerization to prepare EPS is conducted in a process using two different temperature stages and two initiators, a first stage initiator and a second stage or "finishing" initiator, with different half life temperatures, each appropriate for the particular temperature stage. In such a process, dibenzoyl peroxide (BPO) is often used as the first stage initiator at a reaction temperature of about 82° C. to 95° C. Other first stage initiators useful in this temperature range might include tertiary butyl peroxy-2-ethylhexanoate, tertiary amyl peroxy-2-ethylhexanoate and 2,5-dimethyl-2,5-di (2-ethylhexanoylperoxy)hexane. Initiators such as tertiary butyl peroxybenzoate (TBP) or dicumyl peroxide (DCP) are widely used for the higher temperature stage, or second stage, at 115° C. to 135° C. The second stage is usually a finishing step intended to minimize residual monomer in the EPS. In commercial processing, this stage is often held above 125° C. for prolonged intervals to reduce monomer content to acceptable levels.

Characteristic shortcomings of the traditional process are long reaction times necessary to obtain adequate conversion in the first stage and relatively high finishing temperatures required in the second stage.

In view of alleviating this drawback, document U.S. Pat. No. 6,608,150 has proposed an improved process for the preparation of expandable polystyrene in which "intermediate" temperature peroxides, that is to say initiator peroxides having a one hour half life temperature ranging from 101° C. to 111° C., are used. According to this document, the use of such "intermediate" peroxides in the preparation of expandable polystyrene allows to reduce the conversion time for some hours.

Expandable polystyrene, as prepared in the suspension process, is in the form of essentially spherical beads. It is mentioned in U.S. Pat. No. 6,608,150 that some blowing agent, such as pentane, may be used in the process in order to render the polystyrene beads expandable.

However, it is known that the use of pentane in a process of preparation of expandable polystyrene leads to a decrease in the molecular weight as a result of transfer mechanism on the alkane agent (see Principles of Polymerization-George Odian p 203-217, McGraw-Hill Book Company 1970).

Additionally, it is more and more requested in the industry that the polystyrene resins comprise flame retardant additives for safety reasons. For instance, flame retarded resins are widely used in insulation applications. The addition of such additives may also lead to a decrease of the molecular weight of the resulting polystyrene.

It appears then that several factors may lead, in the preparation process of expandable polystyrene, to a significant decrease of the molecular weight of such expandable polystyrene.

BRIEF SUMMARY OF THE DISCLOSURE

By "molecular weight" is meant according to the present application the weight average molecular weight (Mw). According to the present invention, the molecular weight is measured according to the SEC (Size Exclusion Chromatography) method using Polystyrene standards.

It is important that the expandable polystyrene has a high molecular weight in order to guarantee the mechanical properties of the final materials.

The Applicant has now discovered that by using a specific initiator peroxide, it was possible to accelerate the preparation of expandable polystyrene while using a blowing agent and to still obtain polystyrene having a particularly high molecular weight.

The Applicant has also discovered that the continuous addition of said specific initiator peroxide during the polymerization reaction, can also accelerate the preparation of expandable polystyrene.

DETAILED DESCRIPTION OF THE DISCLOSURE

A first aspect of the invention relates to a process for the preparation of expandable polystyrene comprising the following steps:

I°)a) preparing an aqueous suspension comprising styrene monomer

I°)b) heating the suspension at a polymerisation temperature ranging from 100° C. to 120° C., I°)c) adding continuously, before, during and/or after step I°)b) at least one organic peroxide initiator of formula (I) 1-alkoxy-1-t-alkylperoxycyclohexane in which the alkoxy group contains 1 to 4 carbon atoms, the t-alkyl group contains 4 to 12 carbon atoms, and the cyclohexane ring may optionally be substituted with 1 to 3 alkyl groups each, independently having 1 to 3 carbon atoms, ii°) adding a blowing agent selected from the group consisting of alkanes having from 4 to 6 carbon atoms and mixtures thereof.

The process according to the invention allows obtaining expandable polystyrene showing high molecular weight. Preferably, the expandable polystyrene obtainable according to the process of the invention shows a molecular weight (Mw) of at least 170,000 g/mol, preferably of at least 175,000 g/mol, and more preferably of at least 190,000 g/mol.

Because of its high molecular weight, the expandable polystyrene according to the invention may be used efficiently in insulation or packaging applications.

Moreover, the process of the invention has a conversion time reduced compared to the ones of the prior art.

The process of the invention uses at least one organic peroxide initiator of formula (I), ie 1-alkoxy-1-t-alkylperoxycyclohexane in which the alkoxy group contains 1 to 4 carbon atoms, the t-alkyl group contains 4 to 12 carbon atoms, and the cyclohexane ring may optionally be substituted with 1 to 3 alkyl groups each, independently having 1 to 3 carbon atoms.

According to the present invention, it has been found that the use of such a specific organic peroxide of formula (I) in combination with a blowing agent such as an alkane having from 4 to 6 carbon atoms and mixtures thereof allowed to obtain expandable polystyrene having a high molecular weight, in a short time. Such a result could not be obtained with other organic peroxides, having a one hour half life temperature similar to that of compounds of formula (I) but having a chemical formula different than formula (I).

As organic peroxides of formula (I) one can cite 1-alkoxy-1-t-amylperoxycyclohexane and 1-alkoxy-1-t-hexylperoxy-cyclohexane, where the alkoxy group contains 1 to 4 carbon atoms, and the cyclohexane ring may optionally be substituted with 1 to 3 alkyl groups each, independently having 1 to 3 carbon atoms.

In an embodiment of the invention, the at least one organic peroxide initiator is 1-methoxy-1-t-amylperoxycyclohexane (also referred hereinafter as TAPMC).

In a preferred embodiment of the process according to the invention the polymerization mixture is formulated at a temperature below the reaction (polymerization) temperature and subsequently heated to reach said desired reaction temperature. In such a process preferably at most 40% by weight (% w/w), more preferably at most 30 to 20% by weight, and most preferably at most 5% by weight of the organic peroxide, based on the total weight of the peroxide used during the polymerization, is present before step I°)b) at the start of the heating-up phase, while the remainder is added continuously over a period of at least 1, preferably 2, and more preferably 2-4 hours during or after step I')b), depending on the polymerization time. More preferably, the remainder of the peroxide is added from the time the reaction mixture temperature is controlled at the desired reaction temperature.

The use of a small amount of peroxide from the start allows a fast heating up and start of the polymerization, since this peroxide will already (partly) decompose during the heating of the polymerization mixture. When the polymerization mixture reaches the polymerization temperature, the remainder of the peroxide can be added to the mixture to control the further polymerization rate. Preferably, the addition is continuous, since this allows the most accurate control of the polymerization rate and a constant polymerization heat output, ensuring the highest efficiency and polystyrene quality. The addition time of 2-4 hours allows a very efficient use of the initiator. By using such addition times, high yields of high-quality polystyrene were attained.

In another preferred embodiment, the reaction mixture is formulated at or near the polymerization temperature. In this process, hereinafter called warm-start process, it is not necessary to add a certain amount of peroxide at the start while the remainder is dosed over time. However, also in this warm-start process it can be beneficial to add up to 40% w/w of all peroxide immediately after formation of the reaction mixture, the remainder being added over time. Also in this warm-start process preferably at least 10% w/w of all peroxide is present from the moment the reaction mixture reaches the desired reaction (polymerization) temperature. If this procedure is used, the peroxide according to the invention preferably is added as the last ingredient. This procedure is particularly preferred if a certain amount of polymerization inhibitor (a radical trapping species) is present in the reaction mixture. If such a radical scavenger is present, for instance because it is introduced with the monomer wherein it is typically used as a stabilizer, the initially dosed peroxide will react with said scavenger, thus preventing a delayed start of the polymerization reaction.

The organic peroxide initiator of formula (I) is used in a first step i°) of the process of the invention, during which said organic peroxide initiator is heated at a polymerization temperature ranging from 100° C. to 120° C. In an embodiment of the invention, this temperature ranges from 105° C. to 115° C., preferably is 110° C. Such a temperature is close to the one hour half life temperature of the organic peroxides of formula (I), as measured according to the well-known technique of measuring the rate of initiator decomposition in the aromatic solvent cumene. Indeed, in a preferred embodiment of the invention, the organic peroxides of formula (I) are used as first stage initiators.

During the step I)°a), the aqueous suspension is heated, at a polymerization temperature ranging from 100° C. to 120° C., preferably 105° C. to 115° C., and more preferably of 110° C. for a time sufficient to effect at least partial decomposition of said initiator and initiate polymerization of the styrene monomer. This time may range from about 1.5 hours to about 3 hours.

It is to be understood that the words "continuous addition" is used to describe the step of adding peroxide to the polymerizing reaction mixture at polymerization conditions.

The addition can be done intermittently during the polymerization over a period of time wherein preferably at least 20%, preferably at least 40%, more preferably at least 60%, of all monomer used in the process is polymerized, meaning that at least two portions of initiator are added to the reaction mixture, or it can be continuous, meaning that for a certain period of time the initiator is continuously added to the reaction mixture, or any combination of these techniques. Examples of a combination of such techniques include, for instance, a process wherein the initiator is first added continuously, then the addition is stopped, and then again it is added continuously. If an intermittent operation is selected, there are at least 2, preferably at least 4, more preferably at least 10, and most preferably at least 20 moments at the polymerization temperature at which the initiator is added.

Most preferably, the peroxide is added continuously and/or intermittently from the start of the polymerization reaction, preferably after at least 5%, more preferably at least 10%, even more preferably at least 20%, most preferably at least 30%, of the monomer(s) has already been polymerized. During the addition period at least 2, preferably at least 5, more preferably at least 10%, more preferably at least 20%, more preferably at least 30%, and most preferably at least 50%, of all monomer used in the process is polymerized. The addition can be effected at any suitable entry point to the reactor.

In an embodiment of the invention, the aqueous suspension of step i°) further comprises at least one additional organic peroxide initiator, different from said organic peroxide initiator of formula (I).

Preferably, said additional organic peroxide initiator plays the role of the second stage initiator. When the aqueous suspension of step i°) comprises an organic peroxide initiator of formula (I) as first stage initiator and at least one additional other organic peroxide initiator as second stage initiator, step i°) comprises a stage I°)b), during which said suspension is heated at a temperature ranging from 100° C. to 120° C., preferably from 105° C. to 115° C., and more preferably to 110° C., and a second stage I)°c) during which said suspension is heated at a temperature corresponding to the one hour half life temperature of the at least additional other organic peroxide.

Said additional peroxide initiator may be selected among any organic peroxide initiator different from formula (I) and having a one hour half life temperature, as measured according to the well-known technique of measuring the rate of initiator decomposition in the aromatic solvent cumene, above 110° C. In an embodiment of the invention, the additional peroxide initiator is selected from the group consisting of compounds having the formula (II), ie OO-t-alkyl-O-alkyl monoperoxycarbonate, wherein t-alkyl contains from 4 to 12 carbon atoms, preferably from 4 to 5 carbon atoms, and alkyl contains from 3 to 12 carbon atoms, and preferably 8 carbon atoms, and their mixtures.

In an embodiment of the process of the invention, the at least additional peroxide initiator is OO-t-amyl-O-2-ethylhexyl monoperoxycarbonate (also referred to hereinafter as TAEC).

In another embodiment of the process of the invention, the at least additional peroxide initiator is OO-t-butyl-O-2-ethylhexyl monoperoxycarbonate (also referred to hereinafter as TBEC).

These products are respectively commercially available from the company ARKEMA under the tradename "Luperox® TAEC" and "Luperox® TBEC".

In an embodiment of the process of the invention, in particular when OO-t-amyl-O-2-ethylhexyl monoperoxycarbonate or OO-t-butyl-O-2-ethylhexyl monoperoxycarbonate is used as the second stage initiator, the aqueous suspension is heated, during said second stage I°)b'), at a temperature ranging from 120° C. to 140° C., preferably at a temperature of about 130° C. Said second stage may last from 1 to 3 hours.

In an embodiment of the process of the invention, the second stage initiator is added continuously, as the first stage initiator.

In an embodiment of the process of the invention, said first stage lasts about 2 to 3 hours and said second stage lasts about 2 hours.

In another embodiment of the process of the invention, the organic peroxide of formula (I) plays the role of the second stage initiator and said additional peroxide initiator plays the role of the first stage initiator.

In an embodiment of the invention, said organic peroxide initiator of formula (I) is used in the aqueous suspension of step i°) in amounts from 4 to 25 milli equivalents of initiator per liter of styrene, more preferably from 12 to 20 milli equivalents of initiator per liter of styrene.

Styrene is the preferred monomer for the process of the invention. However, up to 15% of the weight of styrene may be replaced by other ethylenically unsaturated copolymerizable monomers such as alkylstyrenes, alpha methylstyrene, acrylic acid esters and acrilonitrile. For example, the styrene monomer to be polymerized may also contain up to 15 weight %, with respect to the total weight of styrene, of copolymerizable monomers other than styrene monomers.

In an embodiment of the invention, said additional organic peroxide initiator used in the aqueous suspension of step i°) in amounts from 1 to 20 milli equivalents of initiator per liter of styrene, more preferably from 2 to 10 milli equivalents of initiator per liter of styrene.

The process of the invention also comprises a step, step ii°), of addition of a blowing agent selected from the group consisting of alkanes having 4 to 6 carbon atoms and mixtures thereof.

The blowing agent may be added to the aqueous suspension at any time during step i°), or after step i°) is completed.

In an embodiment of the invention, the blowing agent is added during step i°), i.e. during the polymerization of the styrene monomer. In such a case, when step i°) comprise a first and a second stages, the blowing agent may be added during the first stage of step i°). For instance, the blowing agent may be added at the end of the first stage of step i°).

In another embodiment of the invention, the spherical beads of polystyrene obtained at the end of step i°) are segregated by size and the blowing agent is added to the segregated spherical beads. This embodiment of the process allows a more precise control of the bead sizes.

In an embodiment of the invention, said blowing agent is selected from the group consisting of butane, 2-methylbutane, pentane, cyclohexane and mixtures thereof. Such blowing agents are well known products which are commercially available.

Preferably, said blowing agent is pentane.

In an embodiment of the invention, the blowing agent is added in amounts ranging from 5 to 10%, by weight, with respect to the weight of styrene.

In an embodiment of the invention, an additive selected from the group comprising flame retardant agents, inorganic suspension stabilizers, such as calcium phosphate or magnesium pyrophosphate, organic suspension stabilizers, such as polyvinylpyrrolidone, polyvinyl alcohol or hydroxyethylcellulose, surfactants, chain transfer agents, nucleating agents, expansion aids, lubricants, plasticizers and mixtures thereof, is added to the aqueous suspension at step i°) or at step ii°).

The flame retardant agent may be selected from the group comprising hexabromocyclododecane (HBCD), .tetrabromobisphenol A (TBBPA), decabromodiphenyl ether (Deca-BDE), pentabromodiphenyl ether (Penta-BDE), octabromodiphenyl ether (Octa-BDE), tris-(dibromopropyl)phosphate, carbon tetrabromide, beta-dibromopropionate, tetrabromoethylene, 1-2-dibromo-1,1,2,2-tetrachloroethane, 1,1,2,2-tetrabromoethane, dibromodichloroethane, 1,2-dibromo-1,1-dichloroethane, 1,2-dibromo-1,2,2-trichloroethane, 1,2,3,4-tetrabromobutane, 1,2,3-tribromopropane, pentabromoethane, tribromotrichlorocyclohexane, 1,2,4-tribromobutane, tetrabromopentane, hexabromoethane, tetrabromodichlorocyclohexane, pentabromomonochlorocyclohexane, 1,2-di-(dibromomethyl)benzene, alpha,beta-dibromoethylbenzene, alpha,beta-dibromopropionate and mixtures thereof.

Preferably, the flame retardant agent is hexabromocyclododecane.

The peroxide or peroxides used in the process according to the invention are added to the aqueous suspension at step i°) in the pure form or, preferably, in the form of a dilute solution or dispersion (such as a suspension or emulsion in styrene). One or more suitable solvents can be used to dilute the initiator. Solvents are of such a nature that it is acceptable to leave them as a residue in the final polymer, as it is the case for solvents that are desired plasticizers for the final resin.

Another aspect of the invention relates to an expandable polystyrene obtainable by the process described above. Such an expandable polystyrene shows a high molecular weight and is therefore useful in insulation or packaging applications. For example, the expandable polystyrene according to the invention may be used in the manufacture of insulation parts, for example in the transport industry. The expandable polystyrene according to the invention may also be used in the manufacture of packaging having good mechanical properties. A further aspect of the invention relates to insulation parts comprising an expandable polystyrene according to the invention. Another aspect of the invention relates to packagings comprising an expandable polystyrene according to the invention.

The present invention will now be further illustrated by means of the following examples.

EXAMPLES

In all examples below, the molecular weight of the product obtained is measured according to the method given hereinabove in the description of the present application.

Example 1

Preparation of 1-methoxy-1-t-amylperoxycyclohexane (TAPMC)

A mixture of t-amyl hydroperoxide (TAHP), cyclohexanone and methanol is treated with 70% sulfuric acid at −6° to −4° C. In fifteen minutes, an equilibrium mixture of 1-methoxy-1-t-amylperoxycyclohexane, 1,1-di-(t-amylperoxy)-cyclohexane and the unreacted starting materials cyclohexanone and TAHP is formed. Small amounts (≈2%) of cyclohexane-1,1-dimethyoxyketal (CDMK) are also produced in the reaction mixture. The reaction mixture is quenched with cold water and the aqueous phase is separated from the organic phase, which is purified by washing.

Example 2

(Comparative) BPO/TAEC

Into a 2 liter pressure vessel of the Büchi type, equipped with a double envelop and specific stirring means (3 blade stirrer on two levels) were added at 20° C. and under stirring 680 g of deionized water with 0.64 g of polyvinyl alcohol (Alcotex® 72.5 available from the company HARCO). Were further added 320 g of styrene monomer with 1.44 g of dibenzoyle peroxide (Luperox® A75 available from the company ARKEMA), and 0.42 g of OO-t-amyl O-2-ethylhexyl monoperoxycarbonate (TAEC available under the trademark Luperox® TAEC from the company ARKEMA). This aqueous suspension was heated at 90° C. for 1 hour and maintained at this temperature for 4 hours for the first polymerization stage. In this example, dibenzoyle peroxide is used as the first stage initiator.

After 5 hours, were further added 21.1 g of pentane in two minutes using a high pressure pump. The reaction medium was then heated at 130° C. for 0.5 hour and maintained at this temperature for 2 hours. In this example, OO-t-amyl O-2-ethylhexyl monoperoxycarbonate is used as second stage initiator.

The reaction medium was then cooled down 1 hour. The obtained polystyrene beads are collected by filtration and dried.

The obtained product has a molecular weight (Mw) of 158,000 g/mol with 970 ppm of residual styrene monomer.

The overall cycle time is 8.5 hours.

Example 3

(Comparative) TAPMC/TAEC

Into a 2 liter pressure vessel of the Büchi type, equipped with a double envelop and specific stirring means (3 blade stirrer) were added at 20° C. and under stirring 680 g of deionized water with 0.64 g of polyvinyl alcohol (Alcotex® 72.5 available from the company HARCO). Were further added 320 g of styrene monomer with 1.02 g of 1-methoxy-1-t-amylperoxycyclohexane (TAPMC) as obtained in Example 1 above, and 0.42 g of OO-t-amyl O-2-ethylhexyl monoperoxycarbonate (TAEC available under the trademark Luperox® TAEC from the company ARKEMA). This aqueous suspension was heated at 110° C. for 1 hour and maintained at this temperature for 2.5 hours for the first polymerization stage. In this example, 1-methoxy-1-t-amylperoxycyclohexane is used as first stage initiator.

After 3.5 hours, were further added 21.1 g of pentane in two minutes using a high pressure pump. The reaction medium was then heated at 130° C. for 0.5 hour and maintained at this temperature for 2 hours. In this example, OO-t-amyl O-2-ethylhexyl monoperoxycarbonate is used as second stage initiator.

The reaction medium was then cooled down during 1 hour. The obtained polystyrene beads are collected by filtration and dried.

The obtained product has a molecular weight (Mw) of 226,000 g/mol with 700 ppm of residual styrene monomer.

The overall cycle time is 7 hours.

Example 4

(Comparative) TAPMC/TBEC

The same process as in Example 3 is repeated with the same amounts and the same cycle time except that the 0.42 g of TAEC is replaced by 0.42 g of OO-t-butyl O-2-ethylhexyl monoperoxycarbonate (Luperox® TBEC available from the company ARKEMA).

In this example, 1-methoxy-1-t-amylperoxycyclohexane is used as first stage initiator and OO-t-butyl O-2-ethylhexyl monoperoxycarbonate is used as second stage initiator.

The obtained product has a molecular weight (Mw) of 220,000 g/mol with 500 ppm of residual styrene monomer.

Example 5

(Comparative) HBCD

The same process as in Example 3 is repeated with the same amounts and the same cycle time except that 2.1 g of hexabromocyclododecane is added at the aqueous suspension of styrene monomer.

The obtained product has a molecular weight (Mw) of 153,000 g/mol with 1600 ppm of residual styrene monomer.

Example 6

(Invention) TAPMC/TAEC Continuous Injection

Into a 2 liter pressure vessel of the Büchi type, equipped with a double envelop and specific stirring means (3 blade stirrer on two levels) were added at 20° C. and under stirring 680 g of deionized water with 0.64 g of polyvinyl alcohol (Alcotex® 72.5 available from the company HARCO). Were further added 320 g of styrene monomer with 0.42 g of OO-t-amyl O-2-ethylhexyl monoperoxycarbonate (TAEC available under the trademark Luperox® TAEC from the company ARKEMA). This aqueous suspension was heated at 110° C. while simultaneously adding continuously at a constant flowrate using a pressure pump a solution made up of 1.02 g of 1-methoxy-1-t-amylperoxycyclohexane (TAPMC) and 26.2 g of styrene. Duration of the injection is 2.5 hours for the first step of the polymerization.

After 2.5 hours, were further added 21.1 g of pentane in two minutes using a high pressure pump. The reaction medium was then heated at 130° C. for 0.5 hour and maintained at this temperature for 2 hours. In this example, OO-t-amyl O-2-ethylhexyl monoperoxycarbonate is used as second stage initiator.

The reaction medium was then cooled down for 1 hour. The obtained polystyrene beads are collected by filtration and dried.

The obtained product has a molecular weight (Mw) of 206,000 g/mol with 764 ppm of residual styrene monomer.

The overall cycle time is 6 hours.

Example 7

(Invention) TAPMC/TAEC Continuous Injection

Into a 2 liter pressure vessel of the Búchi type, equipped with a double envelop and specific stirring means (3 blade stirrer on two levels) were added at 20° C. and under stirring 680 g of deionized water with 0.64 g of polyvinyl alcohol (Alcotex® 72.5 available from the company HARCO). Were further added 320 g of styrene monomer with 0.42 g of OO-t-amyl O-2-ethylhexyl monoperoxycarbonate (TAEC available under the trademark Luperox® TAEC from the company ARKEMA). This aqueous suspension was heated at 115° C. while simultaneously adding continuously at a constant flowrate using a pressure pump a solution made up of 1.02 g of 1-methoxy-1-t-amylperoxycyclohexane (TAPMC) and 20.8 g of styrene. Duration of the injection is 2 hours for the first step of the polymerization.

After 2 hours, were further added 21.1 g of pentane in two minutes using a high pressure pump. The reaction medium was then heated at 130° C. for 0.5 hour and maintained at this temperature for 1 hour. In this example, OO-t-amyl O-2-ethylhexyl monoperoxycarbonate is used as second stage initiator.

The reaction medium was then cooled down for 1 hour. The obtained polystyrene beads are collected by filtration and dried.

The obtained product has a molecular weight (Mw) of 195,000 g/mol with 940 ppm of residual styrene monomer.

The overall cycle time is 4.5 hours.

Example 8

(Invention) TAPMC/TAEC/HBCD Continuous Injection

The same process as in Example 6 is repeated with the same amounts and the same cycle time except that 2.1 g of hexabromocyclododecane is added at the aqueous suspension of styrene monomer.

The obtained product has a molecular weight (Mw) of 193,000 g/mol with 770 ppm of residual styrene monomer.

The overall cycle time is 6 hours.

The invention claimed is:

1. Process for the preparation of expandable polystyrene comprising the following steps:
   I°)a) preparing an aqueous suspension comprising styrene monomer and at most 40% by weight of at least one organic peroxide initiator of formula (I), based on total weight of the peroxide used during polymerization,
   I°)b) heating the suspension at a polymerisation temperature ranging from 100° C. to 120° C.,
   I°)c) adding by continuous addition over a period of about 2 hours to about 4 hours, before, during and/or after step I°)b) a remaining amount of the at least one organic peroxide initiator of formula (I) while present as a dilute solution or dispersion and an additional peroxide initiator of formula (II) in pure form after at least 5% of said styrene monomer has been polymerized where:
   (I) is 1-alkoxy-1-t-alkylperoxycyclohexane, in which the alkoxy group contains 1 to 4 carbon atoms, the t-alkyl group contains 4 to 12 carbon atoms, and the cyclohexane ring may optionally be substituted with 1 to 3 alkyl groups each, independently having 1 to 3 carbon atoms, and
   (II) is OO-t-alkyl-O-alkyl monoperoxycarbonate wherein t-alkyl contains from 4 to 12 carbon atoms and alkyl contains 3 to 12 carbon atoms, and their mixtures, and
   ii°) adding a blowing agent selected from the group consisting of alkanes having from 4 to 6 carbon atoms and mixtures thereof;
   wherein the expandable polystyrene has a maximum molecular weight of 206,000 g/mol and a minimum molecular weight of 170,000 g/mol.

2. Process according to claim 1, wherein the at least one organic peroxide initiator of formula (I) is 1-methoxy-1-t-amylperoxycyclohexane (TAPMC).

3. Process according to claim 1, wherein said blowing agent is selected from the group consisting of butane, 2-methylbutane, pentane, cyclohexane and mixtures thereof.

4. Process according to claim 1, wherein at most 5% by weight (% w/w) of organic peroxide initiator of formula (I), based on the total weight of the peroxide used during the polymerization, is present before step I°)b), while the remaining amount is added by continuous addition over a period of at least 1 hour during or after step I°)b).

5. Process according to claim 1, wherein the temperature of step i°) ranges from 105° C. to 115° C.

6. Process according to claim 1, wherein said additional peroxide initiator is of formula (II):
   (II) OO-t-alkyl-O-alkyl monoperoxycarbonate,
   wherein t-alkyl contains from 4 to 5 carbon atoms, and alkyl contains from 3 to 12 carbon atoms, and their mixtures.

7. Process according to claim 1, wherein said organic peroxide initiator of formula (I) is used in the aqueous suspension of step i°) in amounts from 4 to 25 milli equivalents of initiator per liter of styrene.

8. Process according to claim 1, wherein the styrene monomer to be polymerized also contains up to 15 weight %, with respect to the total weight of styrene, of copolymerizable monomers other than styrene monomers.

9. Process according to claim 1, wherein hexabromocyclododecane is added to the aqueous suspension at step i°) or at step ii°).

10. Process according to claim 1, wherein the aqueous suspension of step i°) comprises the organic peroxide initiator of formula (I) as first stage initiator and the at least one additional other organic peroxide initiator of formula (II) as second stage initiator, step i°) comprises a stage I°)b'), during which said suspension is heated at a temperature ranging from 100° C. to 120° C., and a second stage I°)c') during which said suspension is heated at a temperature corresponding to the one hour half life temperature of the at least additional other organic peroxide of formula (II).

11. Process according to claim 1, wherein the additional peroxide initiator of formula (II) is OO-t-amyl-O-2-ethylhexyl monoperoxycarbonate (TAEC).

12. Process according to claim 1, wherein the additional peroxide initiator of formula (II) is OO-t-butyl-O-2-ethylhexyl monoperoxycarbonate (TBEC).

13. Process according to claim 1, wherein the resulting expandable polystyrene has a molecular weight of at least 175,000 g/mol.

14. Process according to claim 1, wherein the resulting expandable polystyrene has a molecular weight of at least 190,000 g/mol.

15. Process for the preparation of expandable polystyrene comprising the following steps:
- I°)a) preparing an aqueous suspension comprising styrene monomer and at most, 40% by weight of a first peroxide initiator, based on total weight of the peroxide used during polymerization,
- I°)b) heating the suspension at a polymerisation temperature ranging from 100° C. to 120° C.,
- I°)c) adding by continuous addition over a period of about 2 hours to about 4 hours, before, during and/or after step I°)b) at least one additional organic peroxide initiator of formula (I) while present as a dilute solution or dispersion, wherein the first peroxide initiator is different from the organic peroxide initiator of formula (I) where:
  - (I) is 1-alkoxy-1-t-alkylperoxycyclohexane, in which the alkoxy group contains 1 to 4 carbon atoms, the t-alkyl group contains 4 to 12 carbon atoms, and the cyclohexane ring may optionally be substituted with 1 to 3 alkyl groups each, independently having 1 to 3 carbon atoms, and
- ii°) adding a blowing agent selected from the group consisting of alkanes having from 4 to 6 carbon atoms and mixtures thereof;

wherein the expandable polystyrene has a maximum molecular weight of 206,000 g/mol and a minimum molecular weight of 170,000 g/mol.

16. Process according to claim 15, wherein the first peroxide initiator is added in pure form.

17. Process according to claim 15, wherein the first peroxide initiator is of formula (II):
- (II) OO-t-alkyl-O-alkyl monoperoxycarbonate wherein t-alkyl contains from 4 to 12 carbon atoms and alkyl contains 3 to 12 carbon atoms, and their mixtures.

* * * * *